Sept. 30, 1969 R. R. STAMM 3,469,894
DIE SET LEADER PIN WITH SECTIONAL BEARING CAGE
Filed Oct. 12, 1967
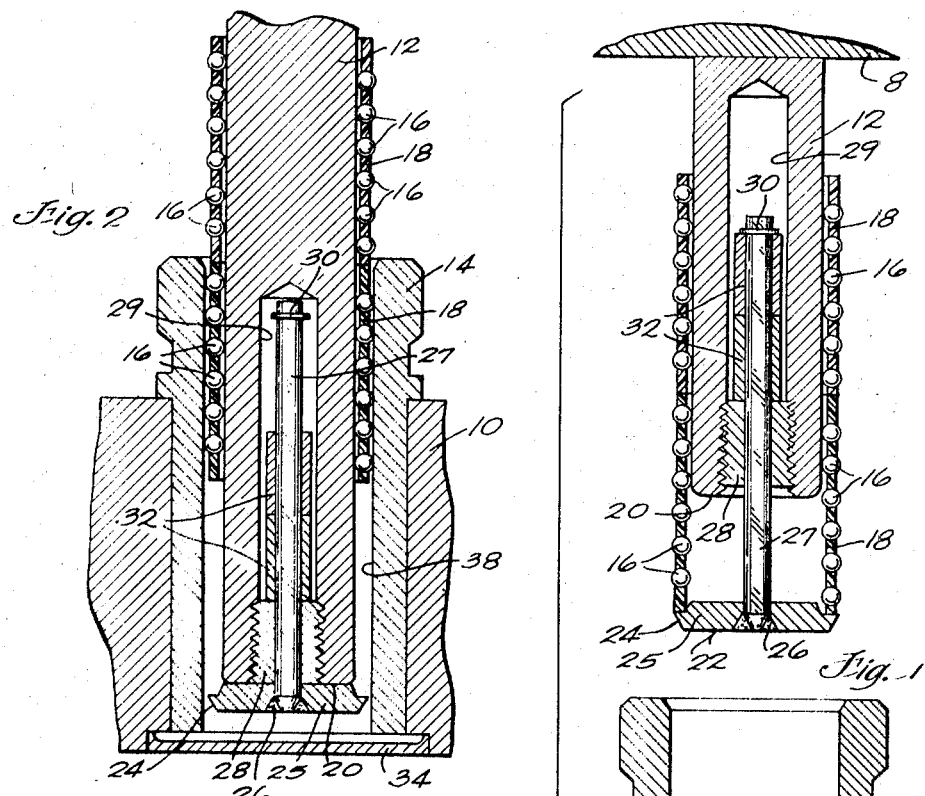
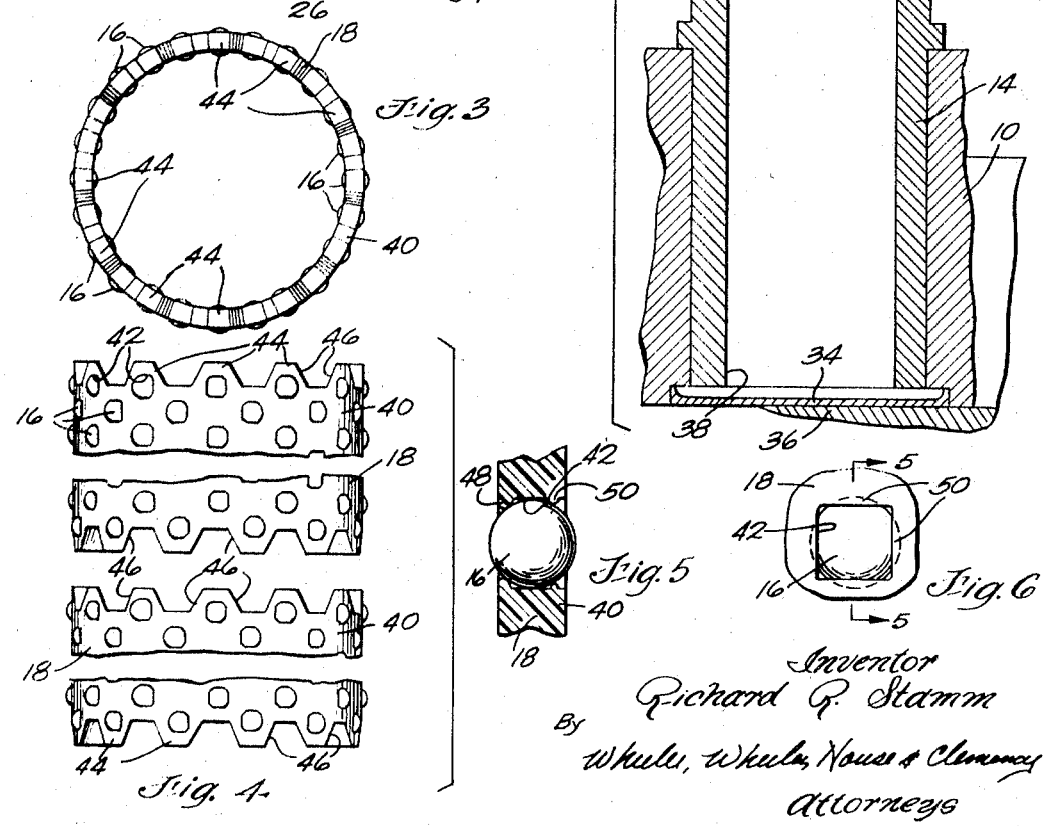
Inventor
Richard R. Stamm
By Wheeler, Wheeler, House & Clemency
Attorneys

United States Patent Office 3,469,894
Patented Sept. 30, 1969

3,469,894
DIE SET LEADER PIN WITH SECTIONAL BEARING CAGE
Richard R. Stamm, Brookfield, Wis., assignor to Superior Die Set Corporation, Oak Creek, Wis., a corporation of Wisconsin
Filed Oct. 12, 1967, Ser. No. 674,846
Int. Cl. F16c 21/00, 19/00, 31/00
U.S. Cl. 308—6        8 Claims

ABSTRACT OF THE DISCLOSURE

Suspended on a leader pin to enter the bushing of a die set is a bearing comprising a plastic retainer or cage in which balls are confined so that the retainer will move in the bushing at half the rate of advance of the leader pin. The cage is sufficiently resilient to yield to permit these balls to be forced to and from their confining pockets. The cage is made in interfitting sections so that a single stock form will serve installations requiring different cage lengths.

Background of the invention

It is known to use anti-friction bearings between a leader pin and its bushing in a die set. However, balls used in such bearings have either been free, and therefore difficult to handle in the assembly of the die set, or have been fixed in relatively expensive cages. When the requirements are such that the cages must be of different length, the cost of producing and stocking such cages has been prohibitively great.

There have also been problems in supporting the anti-friction bearings on the leader pins to partake of leader pin movement while at the same time being movable between the leader pin and the bushing in the use of the die set.

Summary of the invention

The cages or retainers are made of plastic in generally annular form, the wall thickness being less than the diameter of the retainer walls and the cage nevertheless being molded to hold the balls in the pockets provided in the cage. For this purpose, the cage has ball-confining flange at the inner ends of the pockets and thence the pockets are generally cylindrical radially of the walls in an outward direction. However, the wall includes lip portions which project slightly to overhang the respective pockets and thereby yieldably to retain the balls in the pockets. The construction is such that each wall will force aside the resilient overhanging lip to enter or leave its pocket.

The retainer annuli have the ball-receiving pockets in staggered rows and are castellated at their terminal margins to provide axially pojecting teeth into which the terminal pockets of respective rows extend, the teeth of each retainer interfitting with the corresponding teeth of other like retainers so that any number of retainer rings can be loosely associated, or adhered or fused together to make up an elongated retainer.

The ball retainer or retainers encircling the leader pin are supported by a cap of no greater diameter than the retainers and positioned by a supporting rod at a location spaced from the end of the leader pin. The retainers can recede from the supporting cap and move along the leader pin when they enter the bushing. The rod and cap are also yieldable into the leader pin from a position fixed by means adjustable on the rod and engaged with a stop provided in the leader pin.

Brief description of drawings

FIG. 1 is a fragmentary detail view in cross section showing portions of the die carrier and the punch carrier of the die set, and of the leader pin and bushing and the cooperating bearing.

FIG. 2 is a view similar to FIG. 1 showing the leader pin and bearing engaged in the bushing.

FIG. 3 is a plan view of a ball bearing and cage assembly.

FIG. 4 is a view in side elevation of interfitting cage assemblies which are shown slightly separated to illustrate their interlocking portions.

FIG. 5 is an enlarged fragmentary detail view through a portion of a retainer wall taken in section on the line 5—5 of FIG. 6 to show the manner in which the ball retaining pockets are formed with flanges to retain the balls releasably.

FIG. 6 is a fragmentary detail view in side elevation of a portion of a retainer wall showing the preferred manner in which the ball confining flanges are formed.

Description of preferred embodiment

In the fragmentarily illustrated die set, the punch carrier is fragmentarily shown at 8 and the die carrier platen is fragmentarily showin at 10. In movement of the punch carrier 8 to and from the platen 10 for engagement of the punch (not shown) in the die (not shown), guidance is provided by a leader pin 12 mounted on the punch carrier and a bushing 14 mounted in the die carrier or platen.

In accordance with the present invention, the leader pin 12 is supported by a ball bearing from the bushing 14 when engaged therein. The bearing balls 16 are mounted in a manner hereinafter described in a cage 18 which is tubular and encircles the leader pin 12, being supported in a position in which the cage normally projects below the lower extremity 20 of the leader pin. The projection is limited in this particular exemplification by a cap 22 with beveled periphery 24 which engages the lower end of the cage 18 and is reciprocably mounted for movement to and from the end 20 of the leader pin. A central boss 25 is preferably provided on the cap 22 to provide a shouldered seat engaged by the lower end of cage 18.

Welded to the cap 22 as indicated at 26 is a rod 27 of polygonal (hex) cross section which extends through a plug 28 which is threaded into the lower end of leader pin 12 to close an internal bore 29 therein. At the upper end of rod 27 is a split washer 30 resting on one or more spacers 32 which are assembled on the rod to support the rod and cage from plug 28 at the desired elevation. The length of the stack of spacers is such as to define the lowermost limit to which the cage is permitted to advance downwardly respecting the leader pin 12.

The rod and cap may remain in this position unless the cap bottoms on the Welsh plug 34 which closes the lower end of bushing 14 at the level of the bed 36 of the press in which the die set is being used. The balls 16 will enter the bearing surface 38 in the interior of the bushing 14 and, in rolling down such surface between the leader pin and the bushing, the balls will advance the retainer 18 downwardly, the arrangement being such that in the lowermost position of the leader pin, the balls will provide maximum support between the leader pin and bushing. If, in the course of this movement, the cage or retainer 18 moves away from the cap 22, this is a matter of no consequence, the only purpose of the cap being to define the lowermost limit of movement from the cage with respect to the leader pin.

The cage 18 may comprise one or more sections as shown in FIGS. 3 and 4. It is desirably molded of plastic in tubular form with a wall thickness less than the diameter of the respective balls 16. Its wall 40 has numerous ball-receiving pockets 42 which open both inwardly and outwardly and are in staggered rows. Preferably the respective rows of pockets have a pitch of approximately two degrees or thereabouts so that each ball will operate on its own section of the surfaces of the leader pin and bushing between the rows.

One row of pockets extends into teeth 44 which project from the ends of the cage 18. The teeth preferably taper axially away from the body portion of the respective container, having upwardly converging side margins 46, the arrangement being such that the teeth at the end of one retainer 18 will nest snugly between the teeth of a like retainer as indicated at FIG. 4.

Although this view shows the two retainers slightly separated, it is evident that they can be nested together as in FIG. 1 to produce multiple lengths of retainers whenever it is desired that the bearing be longer than can be accommodated economically by a single retainer. When two or more cages are used together, they may be free of physical connection but may conveniently be joined at their castellated ends adhesively or by fusion.

There is a very considerable advantage in making the retainers in sections, since only one size (in any given diameter) needs to be stocked. Moreover, it is much easier and less expensive to produce the dies for a retainer of short length than for a retainer of greater length.

In accordance with the present invention, the dies are so made that each of the ball-receiving pockets 42 is reduced in cross section by a flange 48 at its inner end. At its outer end, each pocket has a ball-receiving opening, four lips being illustrated in FIG. 6. The resilience of the plastic material is sufficient in relation to the very small projection of the lips 50 so that the balls can readily be forced past the retaining lip or lips into the respective pockets and they can likewise be displaced outwardly by exerting radial pressure. This is seldom necessary but does permit replacement of a ball which shows excessive wear.

I claim:

1. A die set including a leader pin and bushing and anti-friction bearing means disposed between the leader pin and bushing in the engagement thereof and characterized by a tubular plastic cage with generally radial apertures containing anti-friction balls which project inwardly and outwardly from the cage, the cage having means for confining the balls in said apertures and having at least one end castellated and provided with axially projecting teeth spaced to receive the correspondingly castellated end of a complementary similar cage.

2. A die set according to claim 1 in which the apertures of the cage are in rows in which the apertures are staggered, the apertures of certain of said rows extending into the teeth at the end of the cage.

3. A die set according to claim 1 in which the leader pin is provided with an internal bore, a plug in said bore, and the cage has a motion limiting rod reciprocable in the bore and provided with a cap with which the end of the cage is engageable, said rod having plug-engaging means for limiting its movement in the bore and hence defining a predetermined position for the cage.

4. A die set according to claim 1 in which a plurality of cages having complementary castellated ends have teeth interlockingly interengaged with each other, the cages being assembled in end to end alignment.

5. A die set according to claim 1 in which the cage is made of resilient synthetic resin and has integral yieldable lip portions restraining the anti-friction balls in the apertures of the cage, said lip portions being yieldable under pressure to permit the passage of respective balls to and from respective apertures.

6. As a new article of manufacture, a bearing cage comprising a plastic tube having a wall portion provided with ball-receiving apertures, balls in the respective apertures and being of greater diameter than the thickness of said wall portion, the wall portion having elastically deformable lip portions confining the balls while exposing peripheral portions of the balls inwardly and outwardly of the cage, at least one end of the cage being castellated, being provided with teeth having axially converging side marginal portions with which complementary teeth of a like cage are interlockingly engageable.

7. The article of claim 6 in which a plurality of like cages have terminal teeth in interlocking engagement and unitarily connected with each other for connecting the cages in series.

8. The article of claim 6 in which both ends of the tube are provided with axially projecting, circumferentially spaced teeth with converging side margins, the tube having spaces between teeth conforming in outline to the teeth and adapted to receive the teeth of a like tube for connecting tubes unitarily in series.

References Cited

UNITED STATES PATENTS

| | | | |
|---|---|---|---|
| 2,304,291 | 12/1942 | Wahlberg. | |
| 2,382,975 | 8/1945 | Coddington | 308—201 |
| 2,706,137 | 4/1955 | Stricklen | 308—201 |
| 2,861,849 | 11/1958 | Case | 308—201 |
| 2,883,244 | 4/1959 | Berger. | |
| 3,055,714 | 9/1962 | Coffin. | |
| 3,141,711 | 7/1964 | Biedinger | 308—201 |
| 3,157,443 | 11/1964 | Draudt | 308—201 |
| 3,271,087 | 9/1966 | Wieland. | |

FOREIGN PATENTS

| | | |
|---|---|---|
| 1,104,870 | 11/1955 | France. |
| 799,126 | 7/1958 | Great Britain. |

MARTIN P. SCHWADRON, Primary Examiner

L. L. JOHNSON, Assistant Examiner

U.S. Cl. X.R.

308—201